Nov. 23, 1926.

C. F. EDDY 1,607,731

METHOD OF RECOVERING FATS AND OILS

Filed April 13, 1925

INVENTOR
Clarence F. Eddy.
BY
ATTORNEYS

Patented Nov. 23, 1926.

1,607,731

UNITED STATES PATENT OFFICE.

CLARENCE F. EDDY, OF NORFOLK, VIRGINIA, ASSIGNOR TO COCOA PRODUCTS COMPANY OF AMERICA, INCORPORATED, OF NORFOLK, VIRGINIA, A CORPORATION OF DELAWARE.

METHOD OF RECOVERING FATS AND OILS.

Application filed April 13, 1925. Serial No. 22,560.

This invention relates to the extraction of fats and oils from oleaginous vegetable materials such as seeds or press cake of peanuts, soybeans, castor beans or flaxseed, and particularly to the recovery of those materials which offer the greatest difficulty in extraction such as cocoa butter from cocoa powder and other cocoa products.

Cocoa butter is a valuable commercial material and is obtained from the cocoa bean by grinding and expressing the fat by the application of pressure to the pulverized material. A high quality of cocoa butter is obtained in this way but the yield is comparatively limited and a considerable proportion of the fat remains in the powder. The separation of this residual fat and of total fat from the cocoa bean has been accomplished by extraction with suitable solvents from which the fat is subsequently separated by distillation. Since the cocoa powder is in a very finely divided condition and because of its physical characteristics, it is particularly difficult to separate the powder from the solvent in which the fat is dissolved. Ordinary filtration is extremely slow because the filter medium is quickly choked with the finely divided powder. Separation by settling and decantation may be employed but is a relatively slow operation and increases consequently the cost of the products.

It is the object of the present invention to provide a method of separating fats and oils from solid products which is more rapid, satisfactory and economical than the methods heretofore available and to avoid the difficulties which have been experienced particularly in extracting cocoa butter from cocoa products.

Further objects and advantages of the invention will be apparent as it is better understood by reference to the following specification and the accompanying drawing, in which—

Fig. 1 is a diagram or flow sheet indicating the operation; and

Fig. 2 is a similar diagram illustrating a modified operation.

In carrying out the invention the oleaginous material is agitated with a quantity of a suitable solvent such as benzene or acetone in which the desired extraction is accomplished. The quantity of solvent and the time required for the extraction will depend upon the nature of the material treated and the content of fat contained therein. When the fat has been extracted the solution with the solid material suspended therein is delivered to a centrifugal machine of the continuous type, that is to say, a machine which is capable of discharging both the liquid and the separated solid continuously. A machine of this type is illustrated in the patent to Elmore, No. 1,342,743. In this machine a layer of the solid material is built up on the revolving screen through which the liquid passes and is maintained at a uniform thickness by the removal of surplus solid material as it accumulates. The liquid and solid material are separately discharged from the machine, the solid being comparatively dry and in the form of powder.

The solid material after separation from the liquid may be delivered to a jacketed conveyor the jacket of which is supplied with steam or other heating medium to effect the removal of any remaining solvent without contact of the heating medium with the powder. The conveyor may be provided with a worm or other device for advancing the powder therethrough until it is discharged in a dry condition from the apparatus. The dry powder may be treated as desired or packaged for shipment.

The liquid from the centrifugal contains the fat in solution and is delivered, therefore, to an evaporator in which the volatile solvent is separated from the fat by evaporation. The vapors are condensed in suitable condensers provided for that purpose and returned for further use in the process. The recovered fat can be subjected to any desired refining operation to produce a finished product free from fatty acids and other constituents which are likely to cause deterioration thereof or it can be used in the crude condition for certain purposes for which it is adapted.

In certain cases it may be desirable to facilitate the separation of the solid material from the extracted solution by the addition of water to the solvent either during or after the extraction. The addition of water offers the advantage that it tends to replace the solvent in the pores of the solid material and thus to increase the recovery of fat therefrom. The fat is distributed uniformly in the solvent and any portion thereof which is retained by the solid carries with it a certain amount of the fat. When the solvent is evaporated in drying the powder the fat, being non-volatile, will remain. The powder has a selective absorptive power for water and when separated in the centrifugal it will carry the water and correspondingly less solution to the dry chamber. The addition of water has another advantage in that it causes a swelling of the solid which facilitates filtration in the centrifugal. If the powder is very fine a correspondingly fine screen will be required and the powder will tend to pack therein, forming a dense mass through which the liquid passes with difficulty. When swelled with water the powder can be held with a coarser screen and the mass contains larger interstices through which the liquid can pass under the influence of centrifugal force. The use of water increases the efficiency of the operation both with respect to the time required and to the yield of fat obtained. As an example of the application of the invention mix one part of cocoa powder with two and one-half parts of benzol and as soon as the powder is wet with the solvent add one-third to two-thirds parts of water depending upon how finely the powder has been ground. Finer grinding requires more water. Stir for twenty minutes at approximately 33° C. or slightly over as the extraction will be much more rapid if the temperature of the solvent is kept above the melting point of the fat. Pass the mixture through the centrifuge and treat the solids with more solvent but no more water as the solids hold substantially all of the water added in the first step.

Under some conditions it may be desirable to apply the principles of counter-current operation to the extraction. A number of agitating tanks may be provided each with a centrifugal. The fresh fat-bearing material can then be extracted in the first tank with a solvent which has been used already in subsequent tanks to extract the partially spent material. In this way the spent material is subjected to fresh solvent and the fresh material is used to increase the fat content of the solvent previously used so that the solvent leaving and passing to the evaporators contains the maximum quantity of fat. At the same time maximum extraction of the solid is assured. After each extraction the solution with the solid suspended therein is delivered to a centrifugal and the products thereof are directed so as to accomplish the desired purpose. Counter-current operation is most economical when applied to raw material containing a relatively large proportion of fat. Where the raw materials contain a small proportion of fat it is preferable to utilize a single extraction and to evaporate the solvent obtained therefrom.

It is desirable to employ as little of the solvent as is necessary to accomplish the purpose since a saving is effected thereby in the heat required for evaporation. It is desirable, however, to employ a fairly large proportion of the solvent as this leads to a higher recovery. It is not possible to indicate the most desirable proportions as these will vary with each raw material treated. The desirable proportions can be determined only by experience with certain grades of raw materials containing fats. The extraction can be improved also as to yield by the application of heat to the solid material either before or during contact with the solvent, but the advantages must be balanced against the cost of applying heat and in many cases it will be preferable to omit heating during the extraction.

Referring to Fig. 1 of the drawing, 1 indicates a storage bin for raw material to be extracted, which is connected by pipe 2 to the tank 4 equipped with agitator 3. In tank 4, the raw material is mixed with solvent from pipe 5 and under certain conditions with water from pipe 6. From tank 4, the mixture passes through a pipe 7 to the continuous centrifugal 8 where solids are separated from the liquid mixture which passes out pipe 9 to suitable stills (not shown) where the solvent is removed from the fat and returned to the system. The solvent and the raw material enter the tank in proper proportions, and the mixture is drawn off at the bottom of the tank in continuous movement at a given rate. Thus the element of time is regulable by the size of the tank and by the rate of travel of the mixture through the tank. The extracted material is discharged to a continuous drier 10 which may be equipped with a screw 11 to break up the material and move it through to drier to the discharge hopper 13. The drier is heated by appropriate means as, for instance, a steam jacket 12. The solvent vapors, with or without water vapor, pass out pipe 14 to a manifold 15 to the condenser 16, The drying may be facilitated by the use of a vacuum pump 17. The liquid solvent would then be returned through pipe 18 to the system, or a mixture of solvent and water would be sent through pipe 18 to an appropriate device for separating the two liquids. Pipe 19 is a vent line from tank 4 to the manifold line 15.

In this apparatus the solid material can be treated in a substantially continuous manner by feeding the fat-containing raw material and the solvent to the vessel 4 and withdrawing and treating the mixture of solvent containing the dissolved fats and oils, and the undissolved solid material.

The centrifugal operates in a continuous manner and the drying of the powder and evaporation of the solvent can be carried out likewise continuously so as to return the solvent for further use and recover the powder and fat separately.

In Fig. 2 of the drawing, 20, 21, and 22 indicate agitating vessels and 23, 24, and 25 the corresponding centrifugals. The liquid mixture with the solid suspended therein is delivered from the vessel 20 through a pipe 26 to the centrifugal 23. In this centrifugal a separation occurs between the partially extracted solid material which has been added to the vessel 20 and the spent solvent which was mixed with with the raw solid material therein. The solvent is withdrawn through a pipe 27 and passes thence to the evaporator (not shown). The solvent recovered from the evaporator can be added to the partially extracted solid material in the vessel 22. The partially extracted solid from the centrifugal 23 is delivered to the vessel 21 where it is mixed with solvent from the centrifugal 25. The mixture of solvent and solid after agitation in the vessel 21 is delivered through a pipe 28 to the centrifugal 24. Here a separation occurs and the separated solution is delivered through a pipe 29 to the vessel 20. The solid passes through a pipe or elevator 30 to the vessel 22 where fresh solvent is added through a pipe 31. After agitation the material passes through a pipe 32 to the centrifugal 25 where the final separation occurs. The solution passes through a pipe 33 to the vessel 21 and the extracted solid material is withdrawn through a drier pipe 34 and passes to the discharge hopper (not shown). The operation of this apparatus is also substantially continuous and produces very high yields and the character of the material treated contains sufficient fat to warrant the successive treatments.

Provision may be made in either type of apparatus for the addition of water to the solvent either during or after the extraction to facilitate the separation in the centrifugal to improve the yield of fat by displacing the solvent in the solid. Provision can be made also for heating the various parts of the apparatus to obtain the benefits of higher extraction with the heated solvent.

A special advantage of the method described herein is the rapidity with which the material can be handled without decreasing the yield obtainable therefrom. In fact, the yield of fat is improved. The cost of recovering the fat is reduced very materially by the saving of time and the elimination of losses which occur in the slower operations of ordinary filtering or settling of the solid from the solvent.

Various changes may be made in the details of the operation and in the apparatus employed without departing from the invention or sacrificing any of the advantages thereof.

I claim:—

1. The method of recovering fats and oils from oleaginous vegetable materials, which comprises subjecting the material to the action of a volatile solvent for the fat and oil, separating the liquid containing the dissolved fat and oil from the insoluble residue by centrifugal action and in the presence of added water, continuously withdrawing both the liquid and the insoluble residue, evaporating the liquid to recover the fat and oil therefrom and removing the residual solvent from the insoluble residue.

2. The method of recovering fats and oils from oleaginous vegetable materials, which comprises subjecting the material to the action of a volatile solvent for the fat and oil, adding water to the mixture of the solvent and solid material, separating and removing the liquid containing the dissolved fat and oil from the insoluble residue by centrifugal action, continuously withdrawing the liquid and the insoluble residue, evaporating the liquid to recover the fat and oil therefrom and removing the residual solvent from the insoluble residue.

3. The method of recovering fats and oils from oleaginous vegetable materials, which comprises causing a continuous flow of such material while subjecting the material to successive treatments with a volatile solvent for the fat and oil flowing in countercurrent thereto, separating and removing the solution containing the dissolved fat and oil from the insoluble residue by centrifugal action after each treatment, utilizing the separated solution in the successive treatments until it is separated from a raw material containing a relatively high proportion of fats and oils, finally evaporating the solvent to recover the fats and oils and removing the residual solvent from the insoluble residue after final treatment with fresh solvent.

4. The method of recovering fats and oils from oleaginous vegetable materials, which comprises causing a continuous flow of such material while subjecting the material to successive treatments with a volatile solvent for the fat and oil flowing in countercurrent thereto, separating and removing the liquid containing the dissolved fats and oils from the insoluble residue by centrifugal action after each treatment and in the presence of added water, utilizing the separated liquid in the successive treatments until it is separated from a raw material containing a relatively high proportion of fats and oils, finally evaporating the solvent to recover the fats and oils and removing the residual solvent from the extracted insoluble residue after final treatment with fresh solvent.

5. The method of recovering fats and oils from oleaginous vegetable materials, which comprises passing the material in continuous movement, while subjecting the moving materials to successive treatments with a volatile solvent for the fats and oils, and separating and removing the solution containing the dissolved fats and oils from the insoluble residue by centrifugal action after each treatment finally evaporating the solvent from the liquid to recover the oils and fats therefrom and utilizing the solvent in such a way that the first of the successive treatments of the material is with a partially spent solvent and the following successive treatments are with a solvent gradually increasing in freshness and finaly treating the material with a totally fresh solvent.

In testimony whereof I affix my signature.

CLARENCE F. EDDY.

5. The method of recovering fats and oils from oleaginous vegetable materials, which comprises passing the material in continuous movement, while subjecting the moving materials to successive treatments with a volatile solvent for the fats and oils, and separating and removing the solution containing the dissolved fats and oils from the insoluble residue by centrifugal action after each treatment finally evaporating the solvent from the liquid to recover the oils and fats therefrom and utilizing the solvent in such a way that the first of the successive treatments of the material is with a partially spent solvent and the following successive treatments are with a solvent gradually increasing in freshness and finaly treating the material with a totally fresh solvent.

In testimony whereof I affix my signature.

CLARENCE F. EDDY.

Certificate of Correction.

It is hereby certified that in Letters Patent No. 1,607,731, granted November 23, 1926, upon the application of Clarence F. Eddy, of Norfolk, Virginia, for an improvement in "Methods of Recovering Fats and Oils," errors appear in the printed specification requiring correction as follows: Page 2, line 115, after the numeral "16" strike out the comma and insert a period; page 3, line 16, strike out the word "with", second occurrence; same page, lines 87 and 88, claim 2, strike out the words "and removing"; page 4, line 17, claim 5, for the misspelled word "finaly" read *finally;* and that the said Letters Patent should be read with these corrections therein that the same may conform to the record of the case in the Patent Office.

Signed and sealed this 21st day of December, A. D. 1926.

[SEAL.]

M. J. MOORE,
*Acting Commissioner of Patents.*

Certificate of Correction.

It is hereby certified that in Letters Patent No. 1,607,731, granted November 23, 1926, upon the application of Clarence F. Eddy, of Norfolk, Virginia, for an improvement in " Methods of Recovering Fats and Oils," errors appear in the printed specification requiring correction as follows: Page 2, line 115, after the numeral " 16 " strike out the comma and insert a period; page 3, line 16, strike out the word " with ", second occurrence; same page, lines 87 and 88, claim 2, strike out the words " and removing "; page 4, line 17, claim 5, for the misspelled word " finaly " read *finally;* and that the said Letters Patent should be read with these corrections therein that the same may conform to the record of the case in the Patent Office.

Signed and sealed this 21st day of December, A. D. 1926.

[SEAL.]
M. J. MOORE,
*Acting Commissioner of Patents.*